United States Patent [19]
Gothard

[11] Patent Number: 6,042,256
[45] Date of Patent: Mar. 28, 2000

[54] LIGHTING DEVICE HAVING HIGHLY DIFFUSE LIGHT EMISSION

[76] Inventor: David Gothard, P.O. Box 6054, San Jose, Calif. 95125

[21] Appl. No.: 09/012,876

[22] Filed: Jan. 26, 1998

[51] Int. Cl.[7] .................................................. F21V 8/00
[52] U.S. Cl. .......................... 362/558; 362/551; 362/583; 362/555; 362/153
[58] Field of Search .................... 362/267, 551, 362/310, 307, 153, 355, 356, 364, 558, 583, 293, 800, 555

[56] References Cited

U.S. PATENT DOCUMENTS

| | | | |
|---|---|---|---|
| 5,165,774 | 11/1992 | Windross | 362/551 |
| 5,408,397 | 4/1995 | Tyson | 362/153.1 |
| 5,842,771 | 12/1998 | Thrasher et al. | 362/267 |

*Primary Examiner*—Thomas M. Sember
*Assistant Examiner*—Erich Falke
*Attorney, Agent, or Firm*—Robert J. Schaap

[57] ABSTRACT

A light device which is capable of generating a very diffuse light emission and, thus, avoids emission of a beam-light or a concentrated light. The device is highly effective as a personnel location indicator or decorative architectural item, since there is effectively no significant light beam. The light device is preferably designed for ground mounted use so as to serve as an indicator of a desired movement path or the like. The light devices comprises an outer housing with a source of light mounted within that housing. One of unique aspects of this lighting device is that it relies upon a fiber optic cable section which functions as a lens or filter through which light from the light source will pass. As the light passes through this lens, it becomes highly diffuse and, therefore, does not generate a light beam or source of concentrated light, as such. Rather, it merely generates a light at a ground level or other surface in which the device is mounted.

17 Claims, 2 Drawing Sheets

6,042,256

LIGHTING DEVICE HAVING HIGHLY DIFFUSE LIGHT EMISSION

BACKGROUND OF THE INVENTION

1. Field of the Invention

This invention relates in general to certain new and useful improvements in lighting devices and, more particularly, to a unique lighting device in which there is substantially no generation of a light beam, but rather merely a generally diffuse source of light.

2. Brief Description of the Related Art

There are many common types of lighting devices which are used for architectural purposes or decorative design purposes or, for that matter, for guidance and locational control of people in groups. As a simple example, lighting devices are commonly found for purposes of generating merely decorative light and specifically designed for illuminating any particular object. However, with essentially all commercially available lighting devices of this type, some type of light beam is inevitably generated and which thereby interferes with the desired overall aesthetic effect.

Lighting devices have also been used for locational movement of people. In many cases, it is desirable to provide indication of paths for movement of large groups of people. This can be accomplished without the use of ropes and other types of barriers and accomplished merely by the employment of lights mounted in a ground surface.

There have also been various types of lighting devices which have been proposed for ground use as, for example, decorative lighting for a location in sidewalks.

The fiber optic light conduit has also been known for a number of years and is effectively employed in the carrying of light between two points, much in the same manner as an electrical conductor carries electrical current. While fiber optic cable is effective for its intended purpose, heretofore it has not been effectively employed as a lens in a light device of the type described.

In all of these lighting devices, there is a generation of light and an emission of a light beam, which is not necessarily desirable. Any beam of light would effective impinge upon the eye of an observer and could be uncomfortable in the same manner as viewing a direct light source. Consequently, it would be desirable to have a highly diffuse light which merely generates a light pattern but does not generate any beam as such.

OBJECTS OF THE INVENTION

It is, therefore, one of the primary objects of the present invention to provide a lighting device which is capable of generating a highly diffuse light source without any substantial light beam associated therewith.

It is another object of the present invention to provide a lighting device of the type stated which relies upon the use of a fiber optic cable functioning as a lens for generating a diffuse light.

It is a further object of the present invention to provide a lighting device of the type stated which is highly effective for achieving desired architectural and decorative effects and can also be used for guidance of people.

It is an additional object of the present invention to provide a lighting device of the type stated which is highly effective in use and can be constructed at a relatively low unit cost.

It is still another salient object of the present invention to provide a method of generating a diffuse light for decorative and/or guidance purposes without any significant light beam associated therewith.

With the above, and other objects in view, my invention resides in the novel features of form, construction, arrangement and combination of parts and components presently described and pointed out in the claims.

SUMMARY OF THE INVENTION

A lighting device for decorative and architectural purposes or for location control of a group of people. The lighting device of the invention is designed to generate a source of light without significant generation of any beam of light, such that an observer will only observe a diffuse light pattern but not a beam of light.

The lighting device of the present invention comprises an outer housing. Located in the outer housing in proximity to one end thereof is a light source, preferably in the form of a socket mounted within the housing and a light bulb carried by the socket. An outer plastic cover extends across the outer open end of the housing and the latter of which is preferably in the form of an elongate tubular housing and, even more preferably, a cylindrically shaped housing.

Located intermediate the light source and the outer cover, which is a transparent cover, or otherwise a translucent cover, is a lens preferably formed of a diametrically enlarged optic fiber. The fiber optic of the invention is not designed to carry light in the same manner as a typical optic fiber, but rather is used as a lens or filter for causing a substantial diffusion of the light generated at the light source. It has been found in connection with the present invention that the optic fiber actually provides very beneficial results in causing a defusion of the light in this fashion.

The lens or filter is actually cut from a fiber optic cable as a slice from the cable. In this case, the lens is cut in a plane, generally perpendicular to the central axis of the cable and, as indicated, constitutes a slice from that cable.

It is also possible to use a light emitting diode in place of a bulb and socket arrangement for the light source, as aforesaid. Moreover, it is also possible to use different colored light emitting diodes. In like manner, a color lens can be disposed on one side of the fiber optic lens in order to impart a desired color to the light emitted from the light device.

Inasmuch as the device is effectively used for in-ground mounting, it is also a completely sealed device. In this respect, the outer translucent or transparent cover is sealed to the housing and the opposite end of the housing, which may be integral with the housing, is also sealed to the housing.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description and the accompanying drawings are not to be taken in a limiting sense.

BRIEF DESCRIPTION OF THE DRAWINGS

Figure 1:
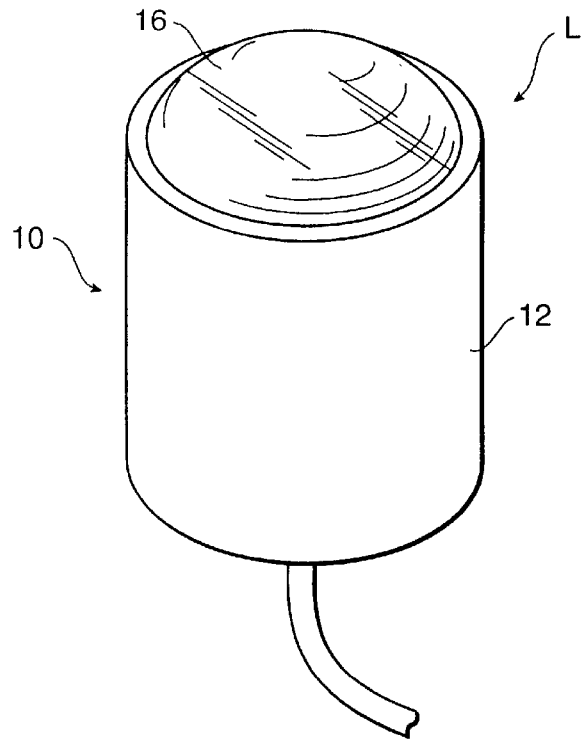
Figure 2:
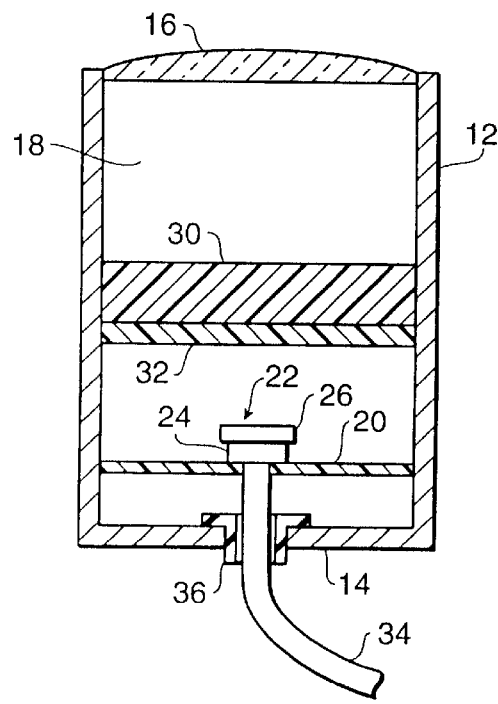
Figure 3:
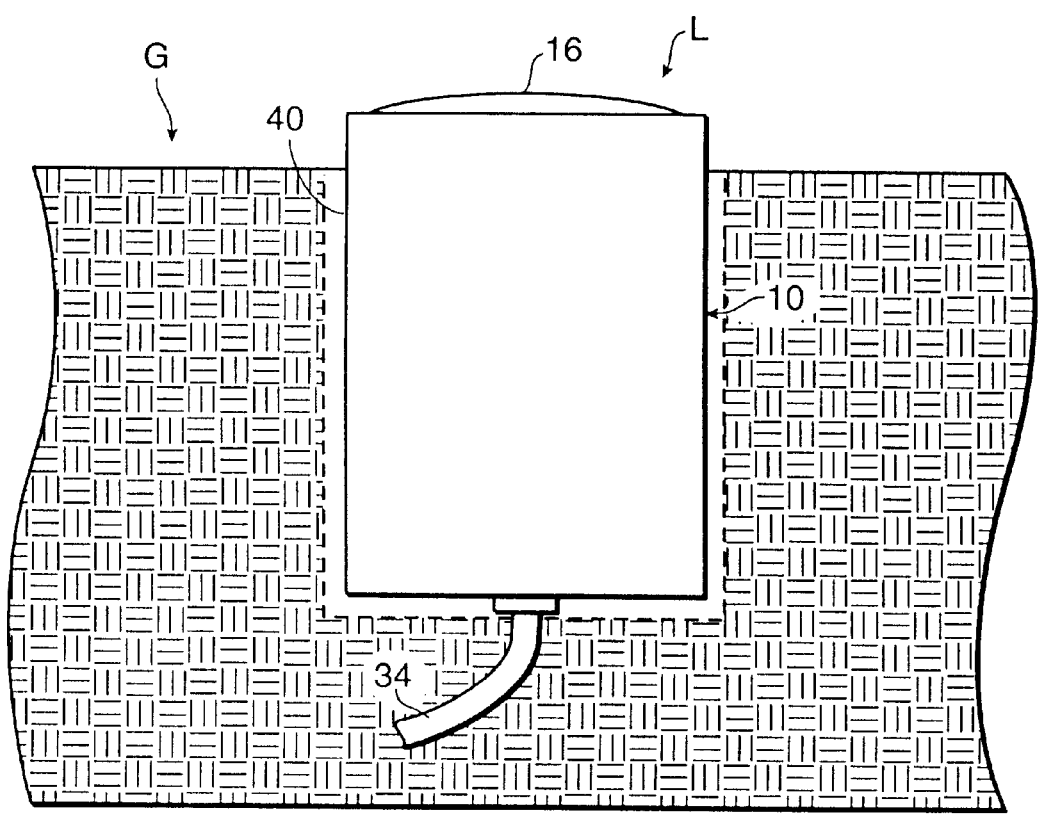

Having thus described the invention in general terms, reference will now be made to the accompanying drawings in which:

FIG. 1 is a perspective view of a lighting device constructed in accordance with and embodying in the present invention; and FIG. 2 is a vertical sectional view taken through the housing of the lighting device;

FIG. 3 is a side elevational view, partially in section and showing a lighting device of the invention mounted in a ground location in accordance with the present invention.

DETAILED DESCRIPTION OF A PREFERRED EMBODIMENT

Referring now in more detail and by reference characters to the drawings, which illustrate a preferred embodiment of the present invention, L designates a lighting device of the type designed to generate a highly diffuse source of light without any significant light beam generation.

The lighting device L comprises an outer housing 10, which in the embodiment as illustrated, is cylindrically shaped and includes an outer cylindrically shaped side wall 12 and an enclosing bottom wall 14. The opposite or upper end of the housing 10 is provided with an outer lens cap 16 which may be either transparent or translucent to permit the passage of light generated within the housing. In this way, the housing has an interior chamber 18 enclosed from the outer atmosphere.

Although not shown, the outer transparent or translucent cap 16 may be sealed to the housing 10 by any conventional means, such that the interior chamber 18 is hermetically sealed with respect to the external environment and thereby prevents the passage of moisture into the interior chamber 18.

The outer lens cap 16 is preferably formed of a fairly durable material capable of withstanding a substantial amount of weight. Thus, the lighting device of the invention can be used as an in-ground lighting device, that is one is which the housing is located beneath the surface of the ground and the outer lens cap 16 are generally contiguous with the surface of the ground. The lens cap 16 should preferably be capable of supporting the weight of an automobile tire or pedestrian traffic walking thereon. Thus, the lens cap 16 could be formed of a suitable polycarbonate material of the type offered under the trademark "Lexan" and which is preferably ultraviolet degradation resistant. The lens cap 16 could also be formed of a colored material, if so desired.

Located within the interior chamber 18 is a support plate 20 for holding a conventional light source 22 which includes a base support 24 mounted on the plate 20 and a light generating means 26 carried thereby. The light generating means could adopt the form of a lighting emitting diode in the form as shown. However, incandescent lights are also highly effective. Thus, the base 24 could be a light socket and the light generating means 26 could be in the form of an incandescent light bulb.

One of the unique aspects of the present invention is the fact that a filter or lens 30 extends across the housing side wall 12 and is basically in contact with the interior surface of the side wall 12 along its entire periphery, such that all light generated by the light source 22 will pass through the lens or filter 30. It has been found in connection with the present invention that when the lens or filter 30 is actually slice of a fiber optic cable, the lens or filter 30 is highly effective in diffusing light. This is an unexpected result, since the fiber optic cable is designed to carry light and usually emits light at one end of the cable much in the same manner as the light enters the opposite end thereof. However, it has been found that when a relatively thin slice of the fiber optic cable is taken in a cross section to the longitudinal central access of the cable, that this slice of cable actually functions as a highly effective light diffuser. In fact, it diffuses light sufficiently so that there is essentially no beam of light which is generated in the housing, as such. Rather, it is merely a source of light.

The filter or lens 30 may also be supported by a transparent plate (not shown) located within the housing and extending across the side wall thereof. This transparent plate can be conveniently and easily formed of a variety of generally transparent plastic materials, again such as polycarbonates and the like.

Power is supplied to the light source 22 by means of electrical cable 34 and which extends through a grommet 36 in the nature of seal at the bottom wall 14. This grommet or seal would thereby effectively serve to maintain the isolation of the interior central chamber 18.

Located on the underside of the filter or lens 30 is a color disk 32. This disk may be physically adhered to the underside or it may be supported on the underside of the lens of filter 30. The disk 32 is effective in importing a color to the light from the light source 22. Thus, merely by changing the color disk 32, it is possible to generate light of a desired color.

It has been found in connection with the present invention that the lighting device can easily and conveniently function as a ground-mounted light, that is one in which the housing is located beneath the surface of the ground and the upper lens cap is generally contiguous with the surface of the ground. The light generally contiguous with the surface of the ground. The light which is disbursed is even and highly diffuse with no light beam generation. The lens cap is more than sufficient to support pedestrian traffic thereon. The device is effective to either serve as a guide for literally guiding pedestrian traffic or to provide accent lights for decorative purposes.

FIG. 3 illustrates the use of the lighting device L of the present invention in a cavity 40 formed in the ground G. In this case, it can be observed that the lenscap 16 extends slightly above the ground surface to enable the generation of light from the housing 10.

The invention is also useful with a plurality of light emitting diodes of different colors. In this way, one diode could be generated to create a red color to advise of an approaching train, a green color to advise that the train is present, a blue color to advise that the train is leaving, etc. The light emitting diode does not have to generate a strong amount of light but only light which can be readily visibly observed from standing pedestrian traffic.

The lighting device of the invention is also useful for mounting in walls of buildings and the like in order to create a desired decorative effect.

Thus, there has been illustrated and described a unique and novel lighting device of the type which can be ground-mounted or otherwise mounted in a surface of a structure and which thereby fulfills all of the objects and advantages which have been sought. It should be understood that many changes, modifications, variations and other uses and applications will become apparent to those skilled in the art after consideration this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A lighting device for generation of a light source without significant generation of any beam of light, said lighting device comprising:

a) an outer canister-type housing having an elongate central axis;

b) a light generating means located within said housing in proximity to (an) a first end thereof;

c) a transparent or translucent end cap capable of permitting passage of light at an opposite second end of the housing; and d) a section of a fiber optic cable which had an axial extent while in said cable and being located within said housing intermediate the light generating means and the end cap and where the axial extent of that section is parallel to the elongate central axis, said section serving as a filter for causing a high degree of light diffusion from the light generating means.

2. The lighting device of claim 1 further characterized in that said filter extends fully across the housing that all light from the light generating means passes through said filter.

3. The lighting device of claim 2 further characterized in that said housing is a tubular canister-type housing having an enclosed end wall in proximity to said section of fiber optic cable and distal to said end cap.

4. The lighting device of claim 3 further characterized in that said enclosed end wall and end cap are sealed to said housing so that said housing is generally sealed to an external environment.

5. The lighting device of claim 4 further characterized in that said lighting device is used in in-ground mounting in a position that the end cap is exposed to the environment above the ground.

6. The light device of claim 1 further characterized in that said light generating means comprises a plate mounted in said housing and a light emitting diode located thereon.

7. An improvement in ground mounted lighting devices having an outer housing and a source of light in the housing and a transparent or translucent end cap extending over an end thereof and located to permit passage of light from the source of light, the improvement comprising:

a) a lens located in said housing intermediate the source of light and the end cap, said lens being comprised of a section of fiber optic cable cut from a cable as a slice transverse to its central axis and which is effective to provide a high degree of diffusion of light passing therethrough.

8. The improvement in the ground mounted light of claim 7 further characterized in that said improvement comprises said lens extending fully across said housing perpendicular to a center axis of said housing.

9. The improvement in the ground mounted light of claim 7 further characterized in the source of light is a light emitting diode.

10. A method of creating a light source with an almost complete absence of any culminated beam of light, said method comprising:

a) generating light from a source of light in a tubular housing having an elongate central axis and allowing the light to pass through the housing;

b) passing all of the light to be emitted from the housing through a section of a fiber optic cable which had an axis extent while in said cable and being located within the housing for causing a high degree of light diffusion in the generated light without any significant culminated beam of light, and where the axial extent of the section is parallel to the elongate central axis; and c) allowing the diffused light to pass outwardly of the housing through a transparent or translucent lens on the housing.

11. The method of creating a light source of claim 10 further characterized in that said method comprises generating the light from the source beneath a ground surface.

12. A lighting device for generation of a light source without significant generation of any beam of light, said lighting device comprising:

a) an outer canister-type housing having an elongate axis;

b) a light generating means located within said housing in proximity to a first end thereof;

c) a transparent or translucent end cap capable of permitting passage of light at an opposite second end of the housing; and d) a lens located within said housing intermediate the light generating means and the end cap and said lens being comprised of a section of fiber optic cable cut from a cable as a slice transverse to its central axis and which is effective to provide a high degree of diffusion of light from the light generating means passing therethrough.

13. The lighting device of claim 12 further characterized in that said lens extends fully across the housing such that all light from the light generating means passes through said filter.

14. The lighting device of claim 13 further characterized in that said housing is a tubular canister-type housing having an enclosed end wall in proximity to said section of fiber optic cable and distal to said end cap.

15. The lighting device of claim 14 further characterized in that said enclosed end wall and end cap are sealed to said housing so that said housing is generally sealed to an external environment.

16. The lighting device of claim 15 further characterized in that said lighting device is used in in-ground mounting in a position that the end cap is exposed to the environment above the ground.

17. The lighting device of claim 12 further characterized in that said light generating means comprises a plate mounted in said housing and a light emitting diode located thereon.

* * * * *